United States Patent
Hoffmann et al.

(10) Patent No.: US 7,897,120 B2
(45) Date of Patent: Mar. 1, 2011

(54) FEEDING DEVICE FOR BUNDLED TUBE REACTOR

(75) Inventors: Michael Hoffmann, Beijing (CN); Renzo Nardini, Vercelli (IT)

(73) Assignee: Sud-Chemie AG, Munich (DE)

( * ) Notice: Subject to any disclaimer, the term of this patent is extended or adjusted under 35 U.S.C. 154(b) by 770 days.

(21) Appl. No.: 11/909,494

(22) PCT Filed: Mar. 23, 2006

(86) PCT No.: PCT/EP2006/002664
§ 371 (c)(1),
(2), (4) Date: Sep. 24, 2007

(87) PCT Pub. No.: WO2006/100070
PCT Pub. Date: Sep. 28, 2006

(65) Prior Publication Data
US 2008/0193267 A1  Aug. 14, 2008

(30) Foreign Application Priority Data
Mar. 24, 2005  (DE) .................. 10 2005 013 845

(51) Int. Cl.
*B01J 8/06* (2006.01)
*B01J 8/00* (2006.01)

(52) U.S. Cl. .................. 422/219; 422/196; 422/197; 422/213; 422/214; 422/232; 141/100; 141/105; 414/415; 414/425; 414/589

(58) Field of Classification Search ............... 422/196, 422/197, 213, 214, 219, 232; 141/100, 105; 414/415, 425, 589
See application file for complete search history.

(56) References Cited

U.S. PATENT DOCUMENTS

| 2,070,868 | A |   | 2/1937 | Smith |
| 3,913,806 | A |   | 10/1975 | Red, Jr. |
| 4,085,759 | A | * | 4/1978 | Seragnoli .................. 131/283 |
| 4,402,643 | A | * | 9/1983 | Lytton et al. ............... 414/160 |

(Continued)

FOREIGN PATENT DOCUMENTS

DE  2613310  10/1977

(Continued)

OTHER PUBLICATIONS

Amendment filed Feb. 2, 2010 in response to Office Action dated Nov. 16, 2009 with respect to U.S. Appl. No. 11/686,383, a "potentially related" application disclosed in an Information Disclosure Statement filed on Aug. 4, 2008.

(Continued)

*Primary Examiner*—Walter D Griffin
*Assistant Examiner*—Huy-Tram Nguyen
(74) *Attorney, Agent, or Firm*—Scott R. Cox

(57) ABSTRACT

A charging device for a tube reactor has a plurality of metering chambers which can be filled with filling material, for example a catalytically coated carrier material. Each metering chamber is adjoined by a drop tube or some other filling device via which a tube of the filling device can be filled in each case. The metering chambers can each be filled via antechambers which are combined into one replaceable antechamber unit.

18 Claims, 5 Drawing Sheets

U.S. PATENT DOCUMENTS

| | | |
|---|---|---|
| 4,441,532 A | 4/1984 | Hrubesh |
| 4,461,327 A | 7/1984 | Magin |
| 4,650,647 A | 3/1987 | Kito et al. |
| 5,890,868 A | 4/1999 | Comardo |
| 5,897,282 A | 4/1999 | Comardo |
| 6,032,828 A | 3/2000 | Gicza |
| 6,132,157 A | 10/2000 | Comardo |
| 6,694,802 B1 | 2/2004 | Comardo |
| 6,966,453 B2 | 11/2005 | Tian |
| 6,981,422 B1 | 1/2006 | Comardo |
| 6,981,529 B2 | 1/2006 | Fry |
| 7,132,088 B2 | 11/2006 | Smid et al. |
| 7,198,767 B1 | 4/2007 | Grochowski |
| 7,381,271 B2 | 6/2008 | Farmwald et al. |
| 7,497,985 B2 | 3/2009 | Fuchs |
| 2002/0175631 A1* | 11/2002 | Kim ........................ 315/169.1 |
| 2008/0292441 A1 | 11/2008 | Zahirovic |

FOREIGN PATENT DOCUMENTS

| | | |
|---|---|---|
| DE | 3935636 A1 | 5/1991 |
| DE | 19934324 | 9/2000 |
| EP | 0311712 A1 | 4/1989 |
| WO | WO9308907 A1 | 5/1993 |
| WO | WO2005118125 A1 | 12/2005 |

OTHER PUBLICATIONS

Office Action dated Nov. 16, 2009 with respect to U.S. Appl. No. 11/686,383, a "potentially related" application disclosed in an Information Disclosure Statement filed on Aug. 4, 2008.

* cited by examiner

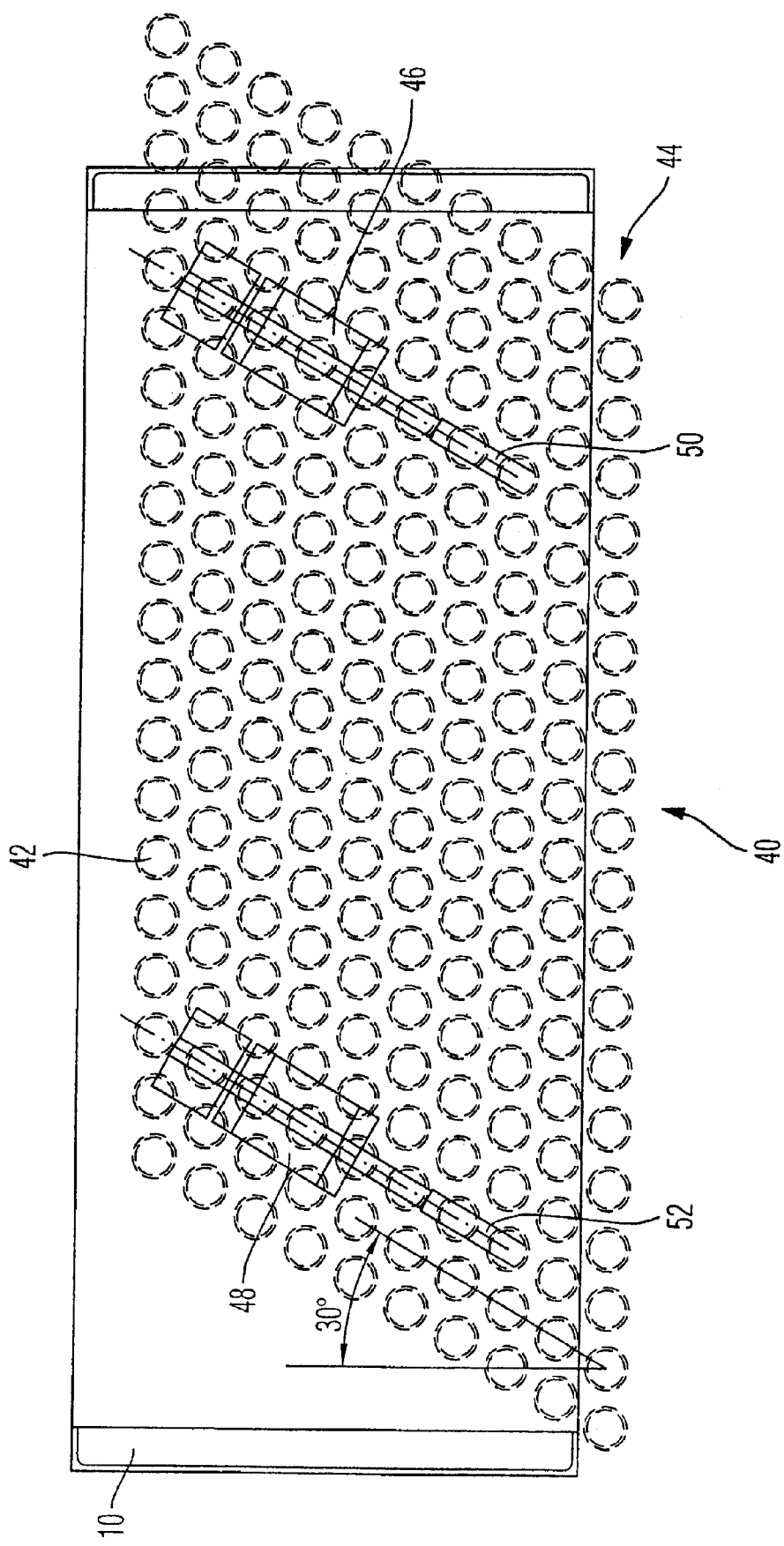

FEEDING DEVICE FOR BUNDLED TUBE REACTOR

The present invention relates to a charging device for tube bundle reactors, according to the preamble of claim 1.

Filling the tubes of tube bundle reactors generally requires granulate solids to be introduced. It has been known for a long time that in view of the large number of tubes which extend in parallel it would be desirable to provide machine support for the filling process. An example of such a tube bundle reactor is already apparent from U.S. Pat. No. 2,070,868. As far as possible the same flow speed of the parallel tubes is already referred to in said document. In order to obtain an acceptable reaction result, the filling process should be as uniform as possible. In order to achieve this, reworking is frequently carried out manually during the automatic filling process (cf. for example U.S. Pat. No. 3,913,806). As far as possible the formation of bridges should be avoided, and comparatively slow and careful pouring in is desired.

However, in the last decade large reactors with, for example, 20 000 or 40 000 tubes have also been constructed. The careful, manual pouring in process must be expected to take a significant amount of time, and since the space above a reactor is usually limited it is also not possible for any desired number of operators to work at the same time. At all events, the manual filling of a reactor is extremely time consuming. In addition to the labor costs, the operator must also expect expensive down times for the filling process.

For this reason, numerous attempts have been made to automate the filling process. In order to ensure that the same quantities are always filled into each tube, balances have been used, in which respect reference should be made to DE-A1 30 20 845. In this solution, a metering belt weighing device is used in order to ensure that identical quantities are filled into the tubes.

However, problems also occur with such a solution, which is already extremely complex, owing to the granular consistency of the filling material, which is usually a catalytically coated carrier material. The individual filling material particles accumulate so that nonuniform filling occurs.

Tube bundle reactors often require different filling materials or catalytic converters to be introduced into the tubes of the tube bundle. These different filling materials have, to a certain extent, different consistencies, and at any rate usually different quantities of them are filled in. It is then important here that not only the entire tube of the tube bundle reactor is filled in to the correct filling level and compaction but also that the respective filling material is filled into each pipe to the respectively required quantity. For example, three or four different filling materials must frequently be introduced in succession.

In order, nevertheless, to be able to ensure the corresponding filling levels it has been proposed to carry out only partial filling of the metering chambers. However, when only partial filling is carried out it is difficult to check the filling level of the metering chambers themselves.

A further proposed possibility is to operate with extremely small metering chambers and to carry out multiple filling processes. If, for example, the three filling materials are to be filled into the tubes of the tube bundle reactor with a ratio of 3:5:1, the respective metering chamber is first filled three times with the first material and emptied, then five times with the second material and then once with the third material. However, this method is extremely time consuming, similar to the manual filling process, so that it has not become accepted practice.

In addition, it has already been proposed to charge the metering chambers themselves with pre-portioned quantities of filling material. This method is also comparatively expensive and accordingly has not become accepted practice.

In addition, U.S. Pat. No. 5,890,868 has disclosed a metering carriage which can move on rails and which performs the corresponding metering process after being filled from a reservoir container. The individual chambers of the metering carriages are filled via a pivotably suspended slide which can be activated by a pneumatic cylinder, the intention being to compensate for the varying height by means of a height adjustment of the feed funnel. This solution is basically not very suitable for multiple filling of tubes, in particular if different heights per filling material are to be realized.

In addition, in the case of such a charging device, a varying degree of compaction occurs in the individual tubes of the tube bundle reactor as the filling material particles tend, when dropping into the tubes, to accumulate with one another in different ways. Accordingly, the flow resistance also varies, causing different reaction times to arise as a result of the different differential pressure loss in the individual tubes of the tube bundle reactor. The quality of the reaction product which is generated thus drops significantly.

In order to prevent this, manual reworking usually occurs, and in terms of time this is at least as costly in the order of magnitude as manual filling, or the poor quality of the reaction product has to be accepted.

In contrast, the invention is based on the object of providing a charging device for tube bundle reactors according to the preamble of claim 1 which permits improved quality of the reaction product of the tube bundle reactor but nevertheless operates particularly efficiently without a significantly greater degree of structural expenditure being necessary.

This object is achieved according to the invention by means of claim 1. Advantageous developments emerge from the subclaims.

The charging device according to the invention for tube bundle reactors is firstly distinguished by the implementation of metering chambers from which a drop tube or some other feed device extends downward. According to the invention, the metering chambers can each be filled via antechambers which are combined in a replaceable antechamber unit. This provides the possibility of making available precisely correspondingly different filling levels already in the metering chambers as a function of the selected antechamber unit. Uniform compaction of the filling materials can be ensured by emptying into the tubes, preferably via a vibrator, a sealing lip being provided as a discharge lip in one advantageous embodiment of the invention, said discharge lip interacting with the bottom of the metering chamber and ensuring the desired separation of the particles of the filling material there.

In this context, the discharge lip benefits from its homogenization effect which elastically limits the discharged layer height or volume flow level.

For this purpose, according to the invention a limited shearing effect can be used, which occurs between the surfaces of the metering device which move elastically with respect to one another between the vibrator bottom and discharge lip. According to the invention, the shearing effect can be used particularly effectively for separating the particles of the filling material without, however, parts of particles breaking out or being broken off. Instead, the discharge lip according to the invention acts extremely gently and is so elastic that it fits snugly against the conveyor profile of the discharged carrier material.

According to the invention it is particularly favorable if the desired antechamber unit is preselected with a selector device. The selector device can be combined with an encoding means which prevents the incorrect antechamber unit being inadvertently used. A slide which provides the possibility of emptying the contents of the antechambers into the metering chambers here can, in one particularly favorable embodiment, be activated only if the position of the selector device, that is to say a selector lever, and the corresponding antechamber unit or cassette correspond to one another.

According to the invention it is also favorable if the conveyed material does not drop into the tubes in freefall but rather is fed to the tubes of the tube bundle reactor via the drop tubes which are, for example, also arranged obliquely. The oblique positioning angle of the drop tubes allows the outlet speed of the filling material to be adapted within large ranges to the requirements.

Surprisingly, the charging device according to the invention provides significantly more uniform filling of the reactor tubes. The manual reworking is for the first time now virtually no longer necessary even if stringent demands are made of the uniformity of the filling and thus of the quality of the reaction product.

In one favorable embodiment of the invention there is provision for the antechambers to be firstly filled jointly with filling material which is then emptied jointly into the metering chambers through the activation of a slide or a shut-off device. This measure results in the same filling volume for each metering chamber. However, irrespective of this, according to the invention it is particularly significant that the non-damaging way of charging prevents parts of particles or grains of the filling material being repelled.

According to the invention it is particularly favorable if the antechamber unit is present as a closed filling cassette. Reliable transport can be ensured by means of a slide which is guided in the manner of a drawer and which closes the antechamber unit.

According to the invention it is particularly favorable that as a result of the activation of the slide the filling material drops simultaneously into all the metering chambers from all the antechambers. As a result, there is virtually a type of pre-portioning without pre-processing effort being required. Subsequent to this, the next antechamber unit with the next desired filling material can then be fitted onto the metering chamber unit within a short time. The row of tubes of the tube bundle reactor which is to be filled is then already preferably charged by activating the vibrator and as a result introducing the filling material into the respective tubes via the oblique bottom, braked by the discharge lip. Of course, at the same time it is possible to set the charging speed and thus the bulk density by, for example, setting the vibration strength or vibration speed of the pneumatic vibrator.

As soon as the desired filling process has taken place, the slide of the antechamber unit is pulled again so that the next type of filling material moves into the metering chambers until all the different antechamber units and filling materials for the respective row of tubes have been introduced.

According to the invention it is particularly favorable that the charging device according to the invention can move automatically on the upper side of the tube bundle reactor. For this purpose, two suitable tappets are provided and they engage in tubes and are used to move the charging device forward with the modular dimension of the tubes so that after a row has been filled the process can move directly on to the next row of tubes.

According to the invention it is particularly favorable that in multi-layer catalytic converter systems the activities of the individual catalytic converter layers can be adapted to the reaction profile along the reactor axis. As a result it is possible to achieve a high yield of valuable products with at the same time the lowest possible formation of undesired intermediate products.

The invention is not restricted to the use of specific filling materials. The filling material particles can be formed, for example, in the form of rings, balls, tablets, perforated tablets, trilobes, perforated trilobes, star shaped extrusions, star shaped tablets, wagon wheels, extrudates, pills or cylinders or granular material, it being possible to use both unsupported catalytic material and catalytically coated carrier material. In the case of catalytically coated carrier material, for example silicon carbide or steatite are preferred materials, but also quartz, porcelain, $SiO_2$, $Al_2O_3$ or aluminum oxide are possible as the carrier material.

Various valuable products can be manufactured with such tube bundle reactors, for example phthalic acid anhydride, maleic acid anhydride, formaldehyde, acrolein, acrylic acid, methacrylic acid, acrylonitrile, glyoxale, ethylene oxide, vinyl chloride, vinyl acetate, oxoalcohols, styrol. The tube bundle reactor can also be used for selective hydrogenation of alkines and dienes, for example in olefine flows.

Further details, advantages and features emerge from the following description of an exemplary embodiment of the invention, with reference to the drawings, in which:

FIG. 5 shows a plan view of a tube bundle reactor for the charging device in which the charging device is illustrated schematically.

Figure 1:
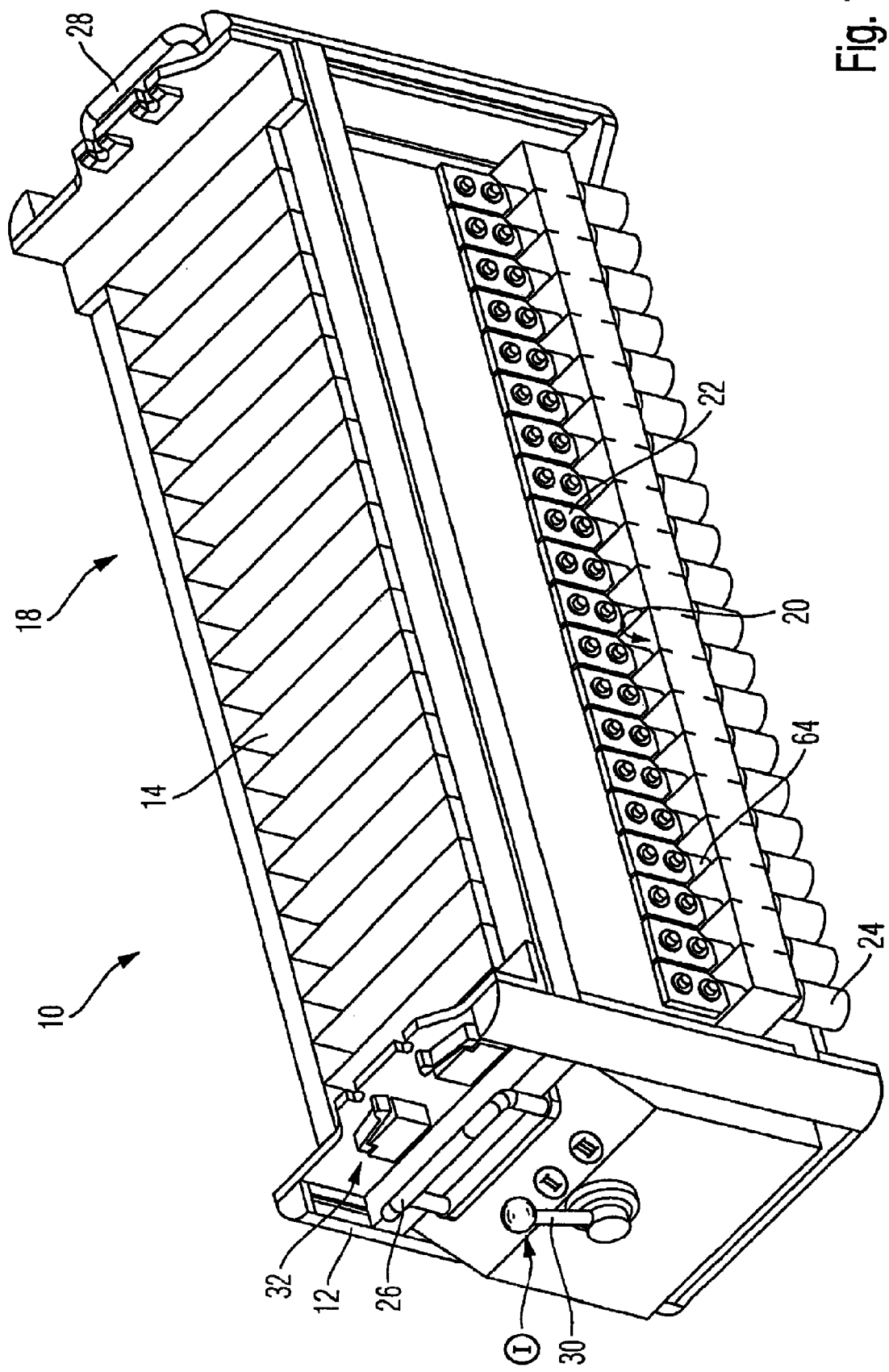
FIG. 1 is a perspective illustration of part of a metering device according to the invention, specifically the metering chamber unit.

The charging device 10 illustrated in FIG. 1 has a frame 12 which is fitted with a plurality of metering chambers 14 which are combined to form a metering chamber unit 18. On the outlet side of the metering chambers 14, the drop tubes 24 are provided, said drop tubes 24 being intended to end above tubes of a tube bundle reactor in FIG. 5. The drop tubes 24 correspondingly have a somewhat smaller diameter than the tubes of the tube bundle reactor.

The metering chambers 14 have a width which corresponds essentially to that of a drop tube. In the example, 20 metering chambers 14 are provided one next to the other, it being possible also to adapt this number within wide ranges to the requirements. At the outlet end, each metering chamber has a discharge lip 64 which projects into an outlet duct 20 of the metering chamber in the manner of an apron. Each discharge lip 64 is mounted in an adjustable fashion in the outlet duct 20 by means of a securing plate 22.

The metering chamber unit 18 has at each of its end sides a handle 26 and 28 by means of which it can be attached, for example, to the upper side of the tube bundle reactor. In addition, a selector lever 30 is provided which is part of a selector device by means of which the filling material to be used here can be selected. The selector lever has three positions I, II and III. It acts in conjunction with an encoding means 32 when the associated antechamber unit is fitted on. Here, the encoding means 32 is illustrated by means of microswitches, any other type of encoding being of course also possible.

Figure 2:
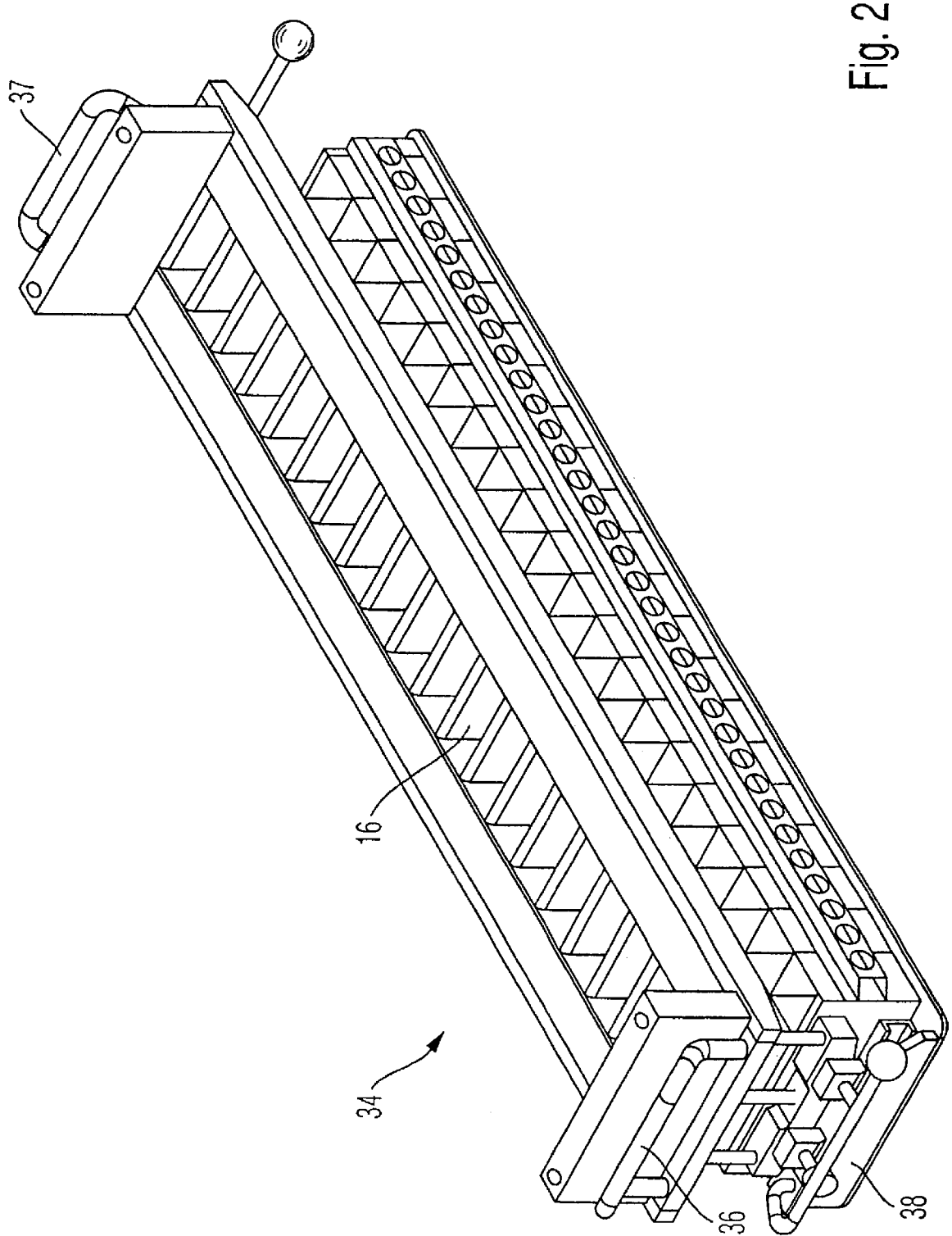
FIG. 2 is a perspective illustration of a further part of the charging device according to the invention in an embodiment, specifically an antechamber unit.
Figure 3:
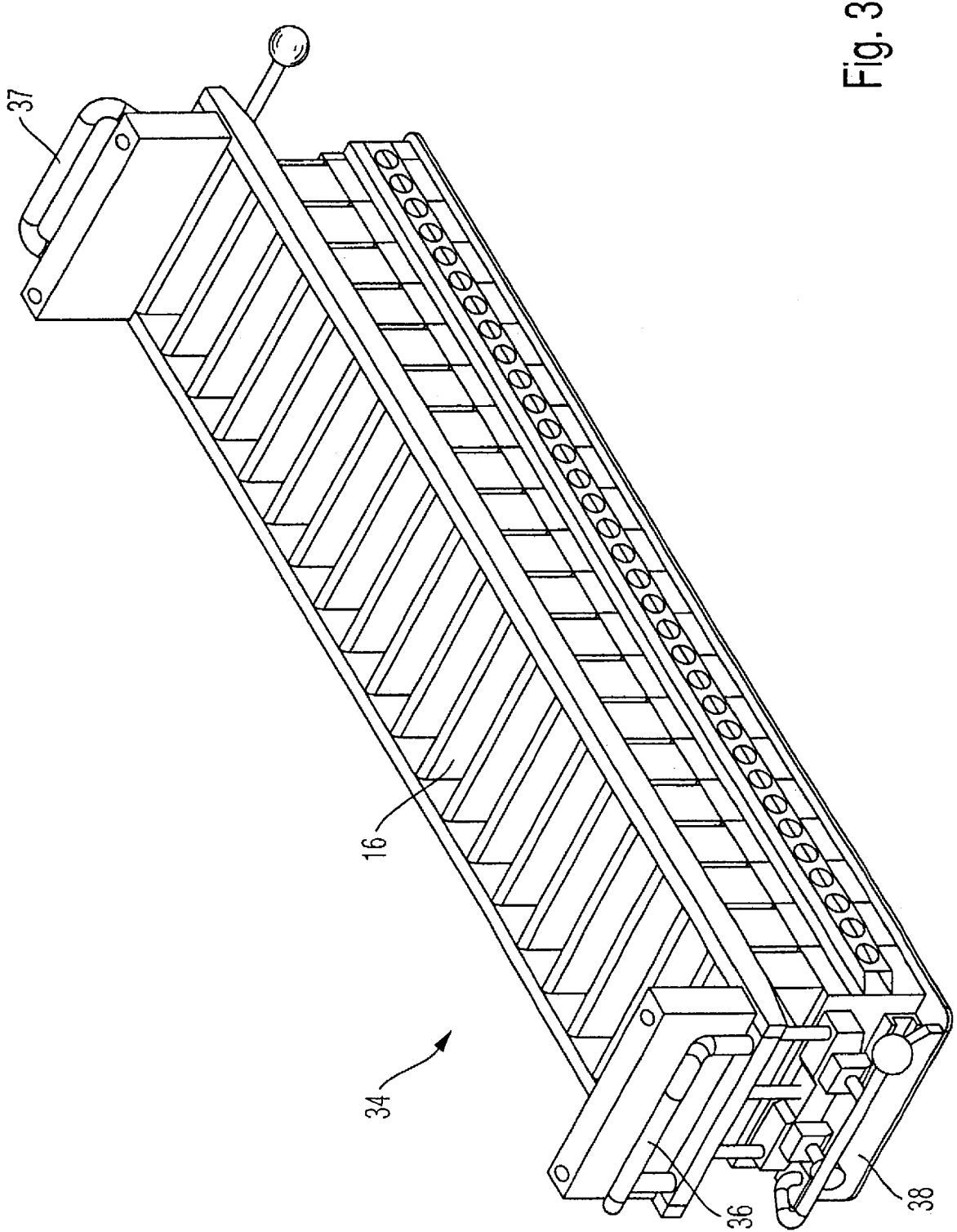
FIG. 3 is a perspective illustration of another embodiment of an antechamber unit according to FIG. 2.

An antechamber unit 34 is shown in FIG. 2. The antechamber unit has a plurality of antechambers 16 corresponding to the number of metering chambers 14 and is intended to be fitted onto the metering chamber unit 18. It also has handles 36 and 37. At its lower end, it is closed off with a schematically illustrated slide 38. As a result of the encoding means 32, the slide 38 can be activated only if the selector lever 30 is in the position which fits the antechamber unit 34. As is apparent from FIG. 2, in this embodiment of the antechamber unit the length of each antechamber 16 is less than the length of the metering chamber 14 so that the correspondingly smaller prefilling volume is made available. This represents a difference from the antechamber unit 34 according to FIG. 3 in which the entire volume is made available. In this way it is possible to premeter different quantities of filling materials depending on the user's wishes.

Figure 4:
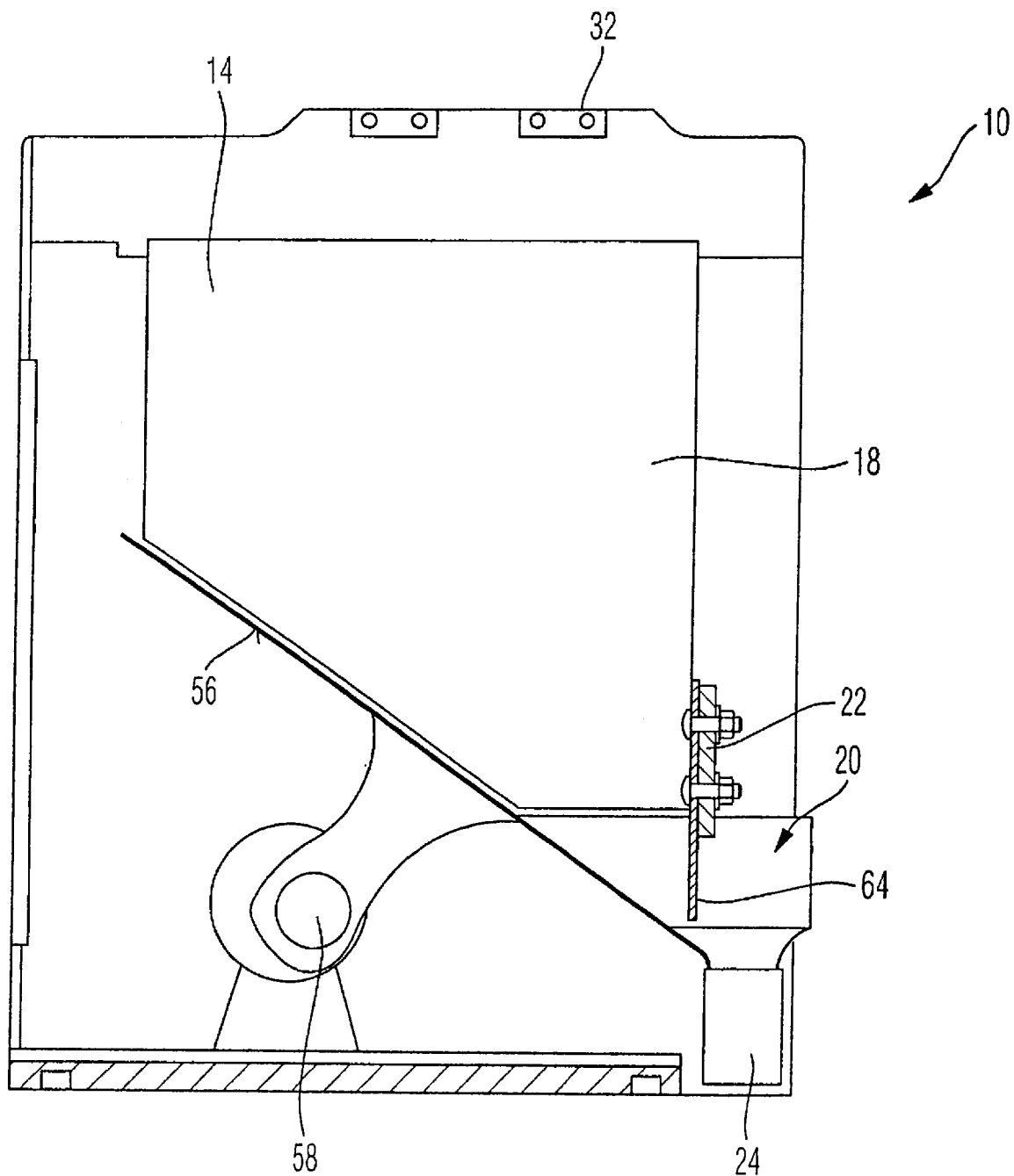
FIG. 4 shows a section through a charging device according to the invention.

FIG. 4 clearly shows the sectional structure of a charging device 10. The metering chamber unit 18 has metering chambers 14 which are arranged one behind the other in the plane of the drawing. Each metering chamber is closed off at the bottom by an oblique bottom 56, the bottom 56 being of continuous design so that it is common to all the metering chambers 14. It is connected to a schematically illustrated vibrator 58 so that filling material tends to migrate downward toward the discharge lip 64 even if the material is a large-grain filling material. The outlet duct 20 which is U-shaped in section is also illustrated in FIG. 4. Here granular, catalytically coated carrier material or unsupported catalytic material can preferably be used, with each filling material particle being able to be in the form of a ring, a tablet or a disk. In a manner known per se, this shaping results in a comparatively large catalytic converter surface, and instead of this it is of course also possible to use spherical carrier material particles.

The charging device 10 is arranged just above a tube bundle reactor 40 which is shown schematically in FIG. 5. The tube bundle reactor 40 has a plurality of vertically extending tubes 42 which are arranged in rows which are offset with respect to one another and are to be filled with the filling material. The row 44 under consideration can have, for example, 20 tubes and the charging device 10 can, in a corresponding way to this, have 20 antechambers 16, 20 metering chambers 14 and also corresponding drop tubes 24 with the same modular dimensioning so that a row 44 can be filled at one go, even if a plurality of different filling materials are used in succession.

Since the rows of tubes are offset with respect to one another it is preferred to drive the charging device forward in the direction of the offset. In the illustrated exemplary embodiment, the offset direction is 30°. In order to make available the advancing movement, two pushing cylinders 46 and 48 are provided and these are each mounted on a charging device 10 and are supported on tappets or supports 50 and 52 which act opposite the reactor.

When a row 44 has been filled, an advancing movement by one modular dimension of the tubes 42 of the tube bundle reactor takes place so that the next row can be filled.

Of course, in practice a tube bundle reactor can have a significantly larger number than 20 tubes one next to the other in one row. Accordingly, the charging device 10 can also be equipped with a significantly larger number of metering chambers etc., but in the case of a large tube bundle reactor provision is made to use the charging device in a successive manner, preferably with a certain degree of offset and thus to fill oblique tube bundle strips one after the other. Of course, instead of this it is also possible to use a plurality of charging devices to fill a large tube bundle reactor.

The charging device according to the invention makes it possible to fill up to 2000 tubes per hour so that a large tube bundle reactor can be filled in one to two days, with the result that the downtime of the system, which is necessary for manual filling, of, for example, four weeks can be reduced to one day.

The invention claimed is:

1. A charging device for tube bundle reactors, comprising a metering chamber unit having a plurality of metering chambers which can be filled with filling materials comprising catalytically coated carrier material, a drop tube or some other feeding device connected to each metering chamber, whereby at least one tube of the tube bundle reactor can be filled using each drop tube, and antechambers for filling the metering chambers, which antechambers are combined into a replaceable antechamber unit, wherein the metering chamber unit further comprises a selector device, and whereby the antechamber unit, which is to be fitted onto the metering chamber unit, can be selected by the selector device, and wherein an encoding device is provided between the antechamber unit and the metering chamber unit which permits the antechamber unit to be emptied as a function of the position of the selector device only if there is correspondence between the position of the selector device and the selected antechamber unit.

2. The charging device as claimed in claim 1, wherein the antechamber unit is present in a cassette form and comprises at least two cassettes for containing different filling materials which can be introduced into the metering chambers.

3. The charging device as claimed in claim 1, wherein the metering chambers which are combined into the metering chamber unit, approximately has the same length and width as the antechamber unit.

4. The charging device as claimed in claim 3, wherein a slide is provided between the antechamber unit and the metering chamber unit wherein activation of the slide permits filling material to be transferred from the antechamber unit into the metering chamber unit and wherein activation of the slide is possible only if there is correspondence between the position of the selector device and the encoding device of the selected antechamber unit.

5. The charging device as claimed in claim 1, wherein the antechamber unit can be filled with filling material while being spatially separated from the metering chambers.

6. The charging device as claimed in claim 1, wherein the metering chambers further comprise a metering outlet which is formed between an outlet lip and a bottom of the metering chamber, and wherein the outlet lip is attached to the metering chamber.

7. The charging device as claimed in claim 6, wherein the outlet lip is coupled to a metering outlet for each metering chamber in the form of an apron.

8. The charging device as claimed in claim 6, wherein the outlet lip is coupled to the metering chamber so as to be adjustable in terms of its vertical position, and is nonrigid, said outlet lip ending in particular between 1 mm and 4 cm, above a bottom of the metering chamber.

9. The charging device as claimed in claim 1, wherein the metering chambers are of funnel shape and have an oblique bottom, wherein the angle of the oblique bottom is 15° to 60° with respect to the horizontal.

10. The charging device as claimed in claim 1, wherein a plurality of metering chambers and feed devices or drop tubes are arranged one behind the other in a row.

11. The charging device as claimed in claim 1 wherein the metering chambers further comprise input openings, which can be shut off by means of a slide, wherein when the metering chambers open, filling material contained in the metering chambers drops out of the antechambers into the metering chambers, and wherein one antechamber is assigned to each metering chamber.

12. The charging device as claimed in claim 1, wherein the drop tube or feed device comprises a sliding rail with a mouth smaller than an internal diameter of one tube of the tube bundle reactor.

13. The charging device as claimed in claim 1, wherein the drop tubes are less than 30 cm long.

14. The charging device as claimed in claim 1 further comprising a vibrator connected at least to a bottom of the metering chambers, wherein filling material can be fed to a metering outlet via said vibrator.

15. The charging device as claimed in claim 1, further comprising a drive device mounted on the metering chamber unit, which is adapted to engage in at least one tube of the tube bundle reactor or is supported on an undercut on the surface of the tube bundle reactor so that the metering chamber unit moves by means of the drive device with a modular dimension of the tubes of the tube bundle reactor.

16. A method for operating a charging device for tube bundle reactors, comprising introducing filling material into an antechamber unit, and feeding the filling material to a series of tubes of a tube bundle reactor via a metering chamber unit with metering chambers, wherein at least one further, different filling material is introduced into another antechamber unit and is fed into the tubes via the same metering chambers of the same metering chamber unit, wherein the antechamber unit, which is to be fitted onto the metering chamber, is selected via a selector device, which contains the metering chamber unit, which combines the metering chambers.

17. A method for operating a charging device for tube bundle reactors, comprising feeding a filling material, as an unsupported catalytic material or as a catalytically coated carrier material, to an antechamber unit mounted on a metering chamber unit in a replaceable fashion, wherein at least two antechamber units are combined with the metering chamber unit, wherein the antechamber unit is selected via a selector unit, which contains the metering chamber unit, which combines the metering chambers.

18. A method for operating a charging device for tube bundle reactors, containing different filling materials, in different quantities, in the form of rings, balls, tablets, perforated tablets, trilobes, perforated trilobes, star shaped extrusions, star shaped profiles, wagon wheels, extrudates, pills and cylinders or granular material, comprising feeding the filling material to different antechamber units which are combined with a metering chamber unit of the charging device, wherein the antechamber unit is selected via a selector unit, which contains the metering chamber unit, which combines the metering chambers.

* * * * *